Feb. 24, 1953 L. H. NELLES 2,629,624
FOLDING SHOVEL OR LIKE TOOL
Filed Sept. 30, 1950
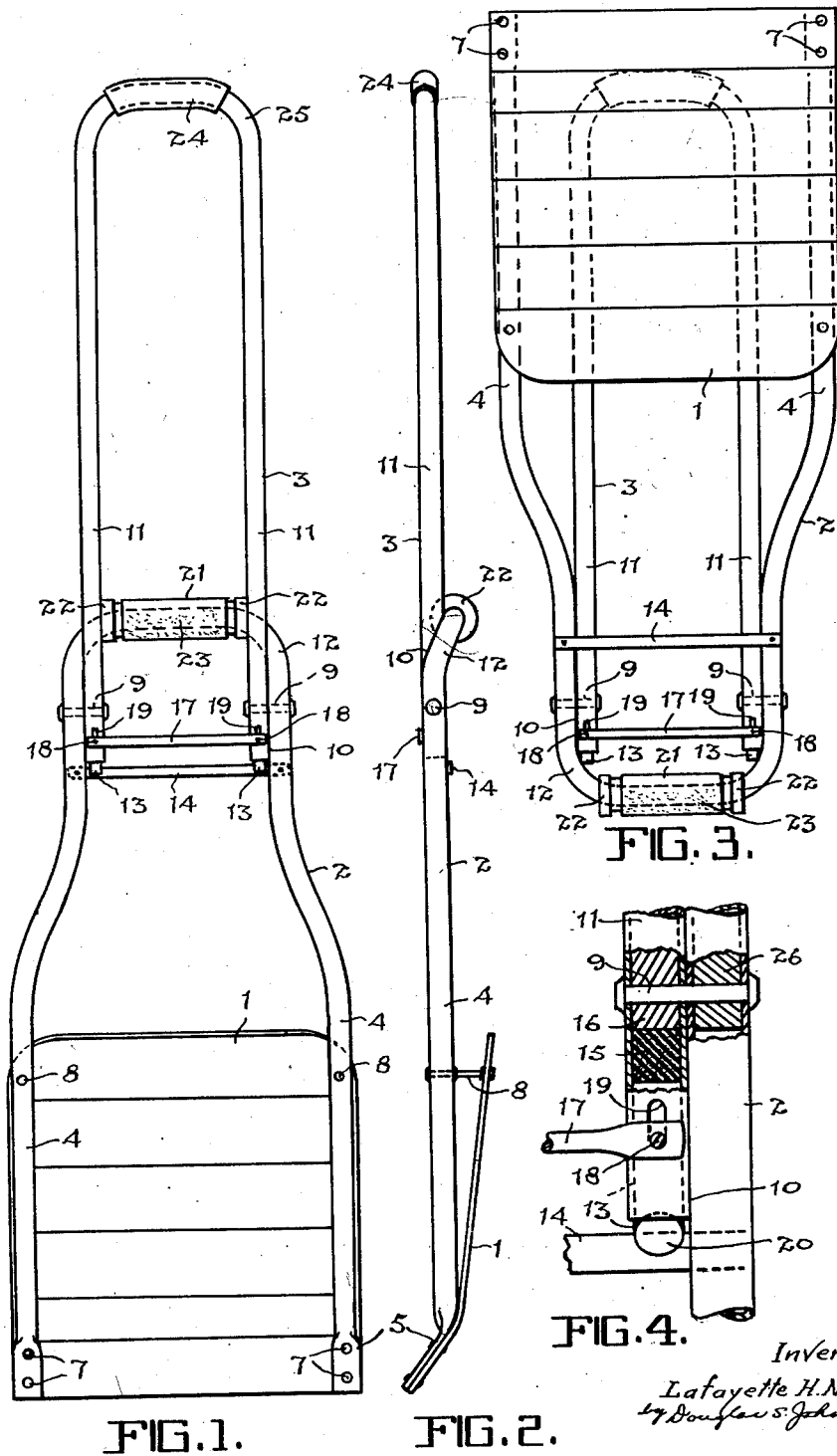
Inventor
Lafayette H. Nelles
by Douglas S. Johnson Patented Feb. 24, 1953

2,629,624

UNITED STATES PATENT OFFICE 2,629,624

FOLDING SHOVEL OR LIKE TOOL

Lafayette H. Nelles, Toronto, Ontario, Canada, assignor to A. W. Taylor Industries Limited, Toronto, Ontario, Canada Application September 30, 1950, Serial No. 187,730

5 Claims. (Cl. 294—57)

This invention relates to an improved construction for shovels or garden tools and the like and more particularly to a folding shovel or the like.

The principal object of the invention is to provide a folding shovel or like tool of extremely lightweight yet sturdy construction which will permit the user to more effectively employ his effort whereby shovelling can be carried out with appreciably less exertion than is required with present shovels.

A further and important object is to provide a shovel construction essentially eliminating the tendency of present shovels to twist in the hand and turn or strain the wrist.

A further object is to provide a folding shovel which can be readily extended and will automatically lock in extended position to form a rigid structure yet which can be readily released for folding and will fold to a very compact unit for storing as for instance in the trunk of an automobile.

The principal feature of the invention consists in providing a novel handle structure wherein load on the scoop of the shovel is distributed and balanced up through the handle to greatly facilitate manipulation of the shovel.

According to the invention the handle comprises a folding frame arrangement having longitudinal side members connected to the sides of the scoop and extending upwardly from opposite sides thereof and connected by spaced transverse bar portions forming hand grips between the sides through which the weight on the scoop is transferred whereby gripping of the handles is in a direction transverse the handle length to positively preclude twisting of the shovel.

A further important feature consists in having the handle frame formed of upper and lower tubular U frames pivoted together with the upper frame within the lower frame, the upper end of the lower frame constituting the bight of the frame being offset and forming a stop for the legs of the upper frame above their pivotal connection when said frames are swung to bring them into handle-forming alignment to brace said frames from collapse under shovel loading and at the same time to form one of the hand grips located conveniently intermediate the length of the handle.

A further feature consists in forming the frames of lightweight tubing.

A further important feature consists in providing a latch arrangement to contain said frames rigidly in extended position with the bight of the lower frame forming a brace resisting shovel loading.

These and other objects and features will become apparent from the following description taken in conjunction with the accompanying drawings.

Figure 1 is a front elevational view of a shovel constructed in accordance with the invention.

Figure 2 is a side elevational view.

Figure 3 is an elevational view showing the shovel in its folded position.

Figure 4 is an enlarged detail of the pivotal connection between the upper and lower frames and the latch arrangement, parts being broken away for clarity.

With reference to the drawings, the shovel comprises a scoop 1 and a handle formed of a lower U-frame 2 and an upper U-frame 3. The lower frame 2 has the lower portion of its legs 4 spread laterally and their lower ends turned angularly at 5, Figure 2. The sides of the scoop 1 at the lower upturned end 6 are secured to the lower U-frame ends 5 by suitable rivets 7, while the sides of the upper end of the scoop are secured to and spaced from the U-frame by the bolts 8.

With the provision of the spaced legs 4 of the lower frame and their securement to the sides of the scoop 1 it will be appreciated that load on the scoop will be distributed and balanced up through the handle to eliminate unbalance occurring with a central handle shaft found in normal shovel constructions where the scoop is not centrally loaded. This feature of distributing the load and providing for balanced shovel operation is carried to the end of the handle by the upper U-frame 3 which is pivoted adjacent its lower end to the legs 4 by the pins 9 adjacent the bight portion 10 of the lower frame.

The legs 11 of the upper frame fit within the lower frame legs 4 and to permit the frames to swing into substantial alignment, as shown in Figure 2, the bight portion 10 of the lower frame is offset at 12 and this offset portion forms an effective stop to prevent collapse of the frames 2 and 3 from swinging past their aligned position of Figure 2 under scoop loading.

The bight 10 further serves in increasing the rigidity of the lower U-frame 2 while forming a brace for the upper U-frame at a point of maximum loading as will hereinafter appear.

While load on the scoop in the manipulation of the shovel will urge the upper frame against the stop 10, it is desirable in swinging the shovel that the joint between the frames be prevented from breaking to fold the shovel. To this end a latch is provided in the form of a pair of short latch bars 13 inserted in the ends of the upper frame legs 11 and urged to project and engage a cross bar 14 carried by the lower frame by the compressible rubber inserts 15 compressed between the latch bars 13 and the plugs 16 through which the pivot pins 9 extend.

To control the movement of the latch bars 13 a cross bar 17 is provided connected to the latch bars by the pins 18 extending through the slots 19 in the legs 11. The cross bar 14 is on the side of the lower U-frame to which the bight 10 is offset, and the ends of the latch bars 13 are bevelled at 20 to provide a cam action enabling them to move inwardly upon contacting the bar as the U-frames 2 and 3 are swung in a direction to extend the handle.

Mounted on the bight 10 of the lower U-frame is a hand grip 21 having end flanges 22 to engage the upper frame legs 11 forming a lateral brace and provided with a rubber cover 23. A suitable hand grip 24 is applied to the bight 25 of the upper U-frame.

To strengthen the lower U-frame at the pivot axis plugs 26 similar to the plugs 16 are incorporated in the tubular formation of the legs 4 to receive the pins 9 with the plugs 16 and 26 relieving bearing stresses on the walls of the tubular frame legs.

In the manipulation of the shovel the user grasps the grip 21 with one hand and the grip 24 with the other hand. This places the user's hands between the sides of the shovel handle as formed by the legs 4 and 11 with the hands gripping in a direction transverse the handle length. With this arrangement and the distribution of the load on the scoop balanced up through the handle the shovel will not twist and the hands of the user will not be turned or strained.

With the hand grip 21 located intermediate the length of the handle and transverse thereof it forms a fulcrum held by one hand and about which the shovel is operated in the lifting of snow, sand or the like by the hand engaging the upper grip 24. The direction of the hand grip at 21 permits the leverage action of the shovel to be readily obtained. Moreover, it is at this point where the fulcruming action is provided that there is maximum loading stress on the handle, and it is here that strength of the handle is maximum by virtue of the bracing by the bight portion 10 having its strength inherently increased by the curving of the tube to form the bight.

While the tubular construction of the frames 2 and 3 provides simplicity and strength, it will be appreciated that other forms of frames may be employed and various modifications of the latching arrangements utilized within the spirit of the invention.

The application of the shovel can of course be general, one specific application being its use with an automobile. To this end it will be appreciated that compactness in folding, the lack of parts that would rattle and with a tight friction bind being provided between the frame and the hand grip of rubber or like material resiliently cushions the scoop 1.

While the working element in the illustration has been depicted as a scoop to form a shovel, it will be appreciated that the invention may be applied to garden tools, such as forks and the like where the working implement may constitute a set of teeth or the like.

What I claim as my invention is:

1. A shovel or a like tool having a relatively wide working element and a handle extending upwardly from the working element, said handle comprising a frame arrangement including a lower frame having spaced longitudinal side members secured to said working element at opposite sides thereof, and a transverse hand grip portion extending between said side members and rigid therewith at the upper end of said lower frame and offset relative thereto in a direction rearwardly of the working element, and an upper frame having spaced longitudinal side members pivotally connected adjacent their lower ends to and disposed within the side members of said lower frame immediately below said hand grip portion, said upper frame being swingable between a position folded on and substantially coextensive with said lower frame and a position extending from said lower frame abutting said hand grip portion, a transverse hand grip extending between said upper frame longitudinal members at the upper end of said upper frame, said first-mentioned hand grip portion forming a fulcrum stop adapted to be held by one hand of an operator and limiting upper frame movement rearwardly of the lower frame and through which said upper frame exerts a leverage under pressure of the other hand of an operator to lift said tool and resilient latch means carried by one of said frames and adapted to engage a stop on the other of said frames to lock said upper frame for movement forwardly of said lower frame.

2. A folding shovel or like tool comprising a working element having a load-receiving face and a handle extending upwardly therefrom, said handle comprising a lower frame with longitudinal side members secured to opposite sides of said working element, and an upper frame having longitudinal side members pivoted to the sides of said lower frame in overlapping relation, the sides of the upper frame lying within the sides of the lower frame and the pivotal axis below the upper end of said lower frame, said upper frame being swingable between a position folded on and substantially co-extensive with said lower frame and a position extending from said lower frame, a hand grip extending transversely between the side members of the upper frame at the upper end thereof, a transverse hand gripping portion extending between the side members of the lower frame above said pivotal axis beneath said upper frame with reference to the face of said working element and forming a fulcrum stop for said upper frame in extended position to bar pivotal movement thereof beyond a plane substantially aligned with said lower frame under loading of said working element, said upper frame in extended position engaging said fulcrum at transversely spaced fulcrum points to receive therebetween a hand lifting on said fulcrum to counterbalance a downward pressure on said upper frame to force same against said fulcrum and effect therethrough a leverage on said working element and releasable means carried by one of said frames and adapted to engage a stop on the other of said frames maintaining said upper frame from pivotal movement away from said fulcrum.

3. A folding shovel comprising a scoop having a load-receiving face and a handle extending upwardly therefrom, said handle comprising a pair of U-frames, one of said frames forming a lower frame having its leg portions secured to opposite sides of said scoop and having the bight portion thereof adapted to form a fulcrum stop offset out of the plane of said lower frame adjacent to and on the side opposite to which said scoop face is presented, the legs of the other of said U-frames forming an upper frame lying within the legs of said lower frame and pivoted thereto below said fulcrum to pivotally support said upper frame to swing between a position coplanar with and extending from said lower frame and a folded position substantially coplanar and co-extensive with said lower frame, said upper frame in extended position engaging said fulcrum at transversely spaced fulcrum points to receive therebetween a hand lifting on said fulcrum to counterbalance a downward pressure on said upper frame to force same against said fulcrum and effect therethrough a leverage on said scoop, said upper frame presenting a bight portion at the upper end forming a hand grip spaced from the aforesaid grip, and resilient means carried by one of said frames and adapted to engage a stop on the other of said frames releasably locking said upper frame from pivotal movement away from said fulcrum.

4. A device as claimed in claim 3 in which said upper frame is tubular and said releasable locking means comprises; plungers slidably mounted in the ends of the tubular legs of said upper frame, resilient means urging said plungers to a position projecting from the ends of said tubular upper frame, stop means on said lower frame under which said plungers are adapted to engage with said upper frame engaging said fulcrum stop, cam surfaces formed on said plungers and co-operating with said stop means to retract said plungers on moving said upper frame against said fulcrum, and means for retracting said plungers when moving said upper frame to a folded position.

5. A device as claimed in claim 4 in which stop means are provided in said upper frame legs and said resilient means comprises resilient compressible elements engaged between said latter stop means and said plungers, and means fixing said latter stop means in position comprising transverse pin means projecting through said latter stop means and the tubing of said upper frame and constituting means of pivoting said upper frame to said lower frame.

LAFAYETTE H. NELLES.

REFERENCES CITED

The following references are of record in the file of this patent:

UNITED STATES PATENTS

| Number | Name | Date |
|---|---|---|
| 744,756 | Haukvik | Nov. 24, 1903 |
| 1,207,472 | Barton | Dec. 5, 1916 |
| 1,519,892 | Webster | Dec. 16, 1924 |